United States Patent
Takada et al.

(10) Patent No.: US 6,826,832 B2
(45) Date of Patent: Dec. 7, 2004

(54) METHOD OF MANUFACTURING FERRULE FOR OPTICAL CONNECTOR

(75) Inventors: Toshiaki Takada, Toyama (JP); Kenji Ijichi, Mishima-gun (JP); Hideo Hige, Nara (JP); Masayuki Okano, Sumida-ku (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/114,292

(22) Filed: Apr. 1, 2002

(65) Prior Publication Data

US 2002/0118927 A1 Aug. 29, 2002

Related U.S. Application Data

(62) Division of application No. 09/439,747, filed on Nov. 15, 1999, now Pat. No. 6,447,173.

(30) Foreign Application Priority Data

Nov. 27, 1998 (JP) ........................................... 10-337472
Nov. 27, 1998 (JP) ........................................... 10-337473

(51) Int. Cl.[7] .............................................. H01R 43/04
(52) U.S. Cl. ............................ 29/862; 29/857; 29/858; 361/306.1; 361/309; 439/271; 439/274; 439/275; 439/279; 439/587
(58) Field of Search ........................ 29/858, 862, 863, 29/871, 857, 861; 361/302, 306.1, 309, 306.2, 303, 307, 320, 321.6, 321.5; 439/271, 274, 275, 279, 587, 588

(56) References Cited

U.S. PATENT DOCUMENTS 4,586,607 A * 5/1986 Dubbs et al. ................ 206/716
6,115,915 A * 9/2000 Kawase ........................ 29/881

FOREIGN PATENT DOCUMENTS

| JP | 5690995 | 1/1981 |
| JP | 5827112 | 2/1983 |
| JP | 6030038 | 2/1985 |
| JP | 617812 | 1/1986 |
| JP | 61137109 | 6/1986 |
| JP | 282206 | 3/1990 |
| JP | 4311589 | 11/1992 |
| JP | 9-80265 | 3/1997 |
| JP | 9-159860 | 6/1997 |

* cited by examiner

*Primary Examiner*—Richard Chang
(74) *Attorney, Agent, or Firm*—Keating & Bennett LLP

(57) ABSTRACT

A method of manufacturing a ferrule for an optical connector including a ferrule body formed of a resin and including a through-hole having an inner wall for releasably receiving an optical fiber, the inner wall of the through-hole being defined by a large-diameter portion and a small-diameter portion which are axially aligned, and a metallic pipe disposed on at least a portion of the inner wall of the through-hole, the metallic pipe being formed of at least one of an alloy of iron-nickel and an alloy of iron-nickel-cobalt.

4 Claims, 4 Drawing Sheets

METHOD OF MANUFACTURING FERRULE FOR OPTICAL CONNECTOR

This is a division of U.S. Appl. Ser. No. 09/439,747, filed Nov. 15, 1999 now U.S. Pat. No. 6,447,173.

BACKGROUND OF THE INVENTION

1. Field of the Invention

The present invention relates to a ferrule for an optical connector attached to the end of an optical fiber, and more particularly to a ferrule for an optical connector formed of a resin. The present invention also relates to a metal article having a through-hole.

2. Description of the Related Art

In a communication network using optical fibers, optical connectors are used to connect optical fibers together. The optical connector requires a ferrule for concentrically butting ends of optical fibers together.

FIG. 6 illustrates a sectional view of a conventional ferrule. In FIG. 6, numeral 1 denotes a ferrule body, numeral 2 represents a through-hole formed of (i) a small diameter portion 3, (ii) a large diameter portion 4, and (iii) a tapered portion 5 expanding toward the large diameter portion 4 from the small diameter portion 3, and numeral 6 denotes a collar portion. The ferrule body 1 is formed of a resin and molded by injection molding using a metallic mold. The small-diameter portion 3 and the large-diameter portion 4 are formed so that center axes thereof are axially aligned. In this ferrule, an optical fiber 7 is inserted, where a length of core wire 8 is inserted into the large diameter portion 4, a length of elementary wire 9 obtained by stripping the hull of the core wire is inserted into the small diameter portion 3, and the end of the elementary wire 9 is positioned at the end of the small diameter portion 3.

A conventional ferrule is formed of an epoxy resin, etc., having a higher thermal coefficient of expansion than that of the an optical fiber. This results in slippage of a butting position of glass portions of the optical fibers and increases transmission loss of optical communication.

In order to improve this problem, a double structure concentrically covering a plastic pipe body with a metallic hollow-body cylinder has been proposed as in Japanese Unexamined Patent Publication No. 58-27112.

According to this structure, it is asserted that deformation and changes in size such as contraction of the plastic material can be prevented and abrasion of the cylindrical collar due to mating and unmating operations of the plug can be well suppressed, thereby offering the advantage of sturdy connections.

Another proposed ferrule structure is formed of two concentric metallic pipes having different outer diameters in the front portion of the ferrule for connecting to a sleeve, etc., and in the back portion of the ferrule and is unitized by a resin with an optical fiber inserted therein. This structure is disclosed in Japanese Unexamined Patent Publication No. 61-137109, for example.

It is asserted that this structure has the advantages of: (i) increased bending strength because the metallic pipes having different outer diameters reinforce the mechanical strength of the resin; (ii) smaller change in size with changes in temperature (i.e., improved thermal coefficient); and (iii) preventing bending of the core wire of the optical fiber during molding of the resin.

Still another proposed structure includes a resin-made connector in which a portion of a metallic ferrule (with an end of an optical fiber cord inserted therein) is crimped and the ferrule is covered by a resin to obtain a unitarily molded item. This structure is disclosed in Japanese Unexamined Patent Publication No. 2-82206. Since the ferrule is crimped relative to the optical fiber and unitarily molded by the resin, it is asserted that the optical fiber can be prevented from separating from the connector and heat and pressure is not directly transmitted to the optical fiber (due to the metallic ferrule) during molding.

However, in the ferrule as disclosed in Japanese Unexamined Patent Publication No. 58-27112, since the elementary wire touches the plastic pipe directly and the plastic has a higher thermal coefficient of expansion, a butting position of the elementary wires of the optical fibers changes and an increase in transmission loss of optical signals results.

The ferrule according to Japanese Unexamined Patent Publication No. 61-137109 requires that the metallic pipes having different outer diameters are arranged concentrically and, therefore, positioning during the manufacturing process is difficult. Further, the connecting position of the optical fibers in the butting position of the ferrule is unstable and adversely affects the transmission loss characteristics of the device.

The ferrule disclosed in Japanese Unexamined Patent Publication No. 2-82206 is formed of a metal; in particular, brass having a large thermal coefficient of expansion is used. Disadvantageously, only crimping is employed to fix the ferrule and prevent the optical fiber from separating from the connector. Therefore, no consideration is given to changes in butting position of the elementary wires of the optical fibers, specifically due to changes in temperature.

SUMMARY OF THE INVENTION

The present invention can solve the aforementioned problems associated with prior art devices and provides a resin ferrule for an optical connector which reduces thermal expansion and contraction resulting from changes in ambient temperature. The present invention further provides a method for manufacturing the resin ferrule. The present invention further provides a novel metal article having a through-hole used for producing the resin ferrule or other devices.

A ferrule for an optical connector according to the present invention comprises a ferrule body formed of a resin with a through-hole formed therein so that an optical fiber can be inserted therein and separated therefrom, the through-hole including a large-diameter portion and a small-diameter portion which are axially aligned; and a metallic pipe unitarily arranged on the inner wall of the through-hole, the metallic pipe being formed of an alloy of iron-nickel or an alloy of iron-nickel-cobalt.

In the ferrule for an optical connector according to the present invention, a thermosetting resin or a thermoplastic resin is preferably used to form the ferrule body. Examples of thermosetting resins include epoxy resins such as cresol-novolak-type epoxy resins, phenol-novolak-type epoxy resins, bisphenol-A-type epoxy resins, biphenyl epoxy resins, dicyclopentadien epoxy resins, and naphthalene epoxy resins. The epoxy resins may include silica as a filler. Examples of thermoplastic resins include polyphenylenesulphide, polycarbonate, polyethersulfone, thermotropic-liquid-crystal polymers, etc.

A metallic pipe made of an alloy of iron-nickel or an alloy of iron-nickel-cobalt is formed by drawing or electrocasting. The metallic pipe is used to produce the ferrule for an optical connector according to the present invention. The metallic pipe may be arranged along the entire length of the through-hole of the ferrule body or may be arranged only in the small-diameter portion of the through-hole. The metallic pipe preferably includes a tapered portion expanding toward the large-diameter portion of the through-hole. Advantageously, an optical fiber may be inserted into the through-hole and smoothly guided from the large-diameter portion toward the small-diameter portion.

A method for manufacturing a ferrule for an optical connector according to the present invention comprises the steps of inserting one end of a metallic pipe into a pin of a metallic mold to fix it thereto, arranging metallic molds around the metallic pipe to form a space therein, charging a resin for a ferrule body into the space, and curing the resin.

In another method for manufacturing a ferrule for an optical connector according to the present invention, a metallic pipe having a tapered portion expanding outwardly in the other end of the metallic pipe is used, the tapered portion is fixed by a movable body, and a resin for a ferrule body is charged and cured. The diameter of the movable body preferably corresponds with that of the large-diameter portion of the through-hole of the ferrule body.

In accordance with the ferrule for an optical connector of the present invention, when the material of the ferrule body is a resin and expands or contracts with changes in ambient temperature, since the metallic pipe (made of an alloy of iron-nickel or an alloy of iron-nickel-cobalt) has a smaller thermal coefficient of expansion than that of the resin, slippage of the butting position of optical fibers is reduced and reduction of optical transmission loss is achieved. When the metallic pipe is disposed at the inner wall of the through-hole, the ferrule is reinforced in its mechanical strength and breakage is prevented.

In accordance with a method for manufacturing a ferrule for an optical connector of the present invention, by fixing one end of a metallic pipe to a pin of a metallic mold and charging a resin for a ferrule body into a space formed around the metallic pipe, the accuracy in the position of the metallic pipe relative to the ferrule body is improved, resulting in better connection of optical fibers together.

BRIEF DESCRIPTION OF THE DRAWINGS

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

Figure 1:
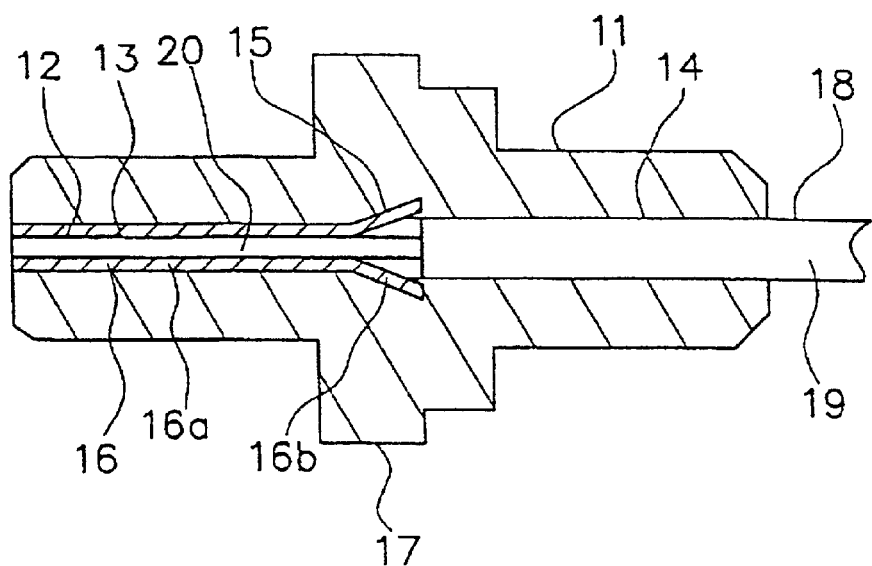
FIG. 1 is a sectional view of a first example of a ferrule for an optical connector according to the present invention.

FIG. 1 is a sectional view of a first example of a ferrule according to the present invention. In FIG. 1, numeral 11 denotes a ferrule body and numeral 12 represents a through-hole formed of a small diameter portion 13 and a large diameter portion 14. The small diameter portion 13 and the large diameter portion 14 are formed so that center axes thereof are axially aligned. Between the small-diameter portion 13 and the large-diameter portion 14, there is a tapered portion 15 being bell-mouth-shaped on the large-diameter portion 14 side.

The inner wall of the small-diameter portion 13 is formed of a metallic pipe 16. The metallic pipe 16 includes a small-diameter-pipe portion 16a and a funnel-shaped (outwardly tapered) portion 16b, where one end of the small-diameter pipe-portion 16a is positioned at the tip of the small-diameter portion 13 and the funnel-shaped portion 16b is arranged along the inner wall of the tapered portion 15.

The tip of the funnel-shaped portion 16b enters into the wall of the ferrule body 11 on the large-diameter portion 14 side. Numeral 17 denotes a collar portion.

An optical fiber 18 is inserted into this ferrule body 11 such that a length of core wire 19 is inserted into the large-diameter portion 14, a length of elementary wire 20 (obtained by stripping the hull of the core wire 19) is inserted into the small-diameter portion 13, and the tip of the elementary wire 9 is positioned at the tip of the small-diameter portion 13.

A material having a lower thermal coefficient of expansion than that of the ferrule body is used as the metallic pipe 16. An alloy system of iron-nickel is preferably used for the metallic pipe 16, specifically an invar (Invar) material. The invar material comprises 36% of Ni (the balance being Fe) and has a thermal coefficient of expansion of 0.9 $10^{-6}/-C$. An alloy system of iron-nickel-cobalt may also be employed for the metallic pipe 16, specifically a super invar material. The super invar material comprises 31 to 33% of Ni, 4 to 6% of Co, and the balance being Fe. This material has a thermal coefficient of expansion of 0.1 $10^{-6}/-C$.

In accordance with a ferrule for an optical connector manufactured according to the present invention, the thermal expansion of the ferrule caused by changes in temperature is small and a coefficient of thermal expansion thereof is similar to that of an optical fiber because the metallic pipe is made of an alloy of iron-nickel or an alloy of iron-nickel-cobalt. Advantageously, slippage of the butting position of optical fibers is reduced enabling a reduction of optical transmission loss. Since the metallic pipe is arranged in the inner wall of the through-hole, the ferrule body (which is made of a resin) is mechanically stronger and the ferrule is prevented from breaking.

This metallic pipe is preferably formed by drawing and electro-casting, for example.

A process for manufacturing the metallic pipe by drawing will now be described. A sheet material (called a blank) of the alloy system of iron-nickel or the alloy system of iron-nickel-cobalt is prepared. The drawing is performed by inserting a punch into the blank pinched between a die and a blank holder. A cylinder with a bottom is obtained by deep drawing, and by cutting off the bottom, the metallic pipe is obtained. In order to obtain the metallic pipe 16 as shown in FIG. 1, shapes of the die and punch should be appropriately matched.

Figure 2:
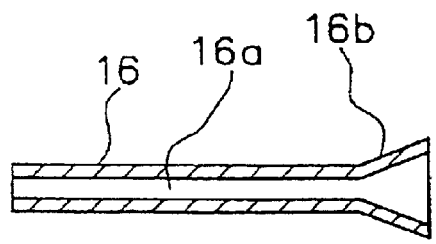
FIG. 2 is a sectional view showing a metallic pipe used in the ferrule of FIG. 1.
Figure 3:
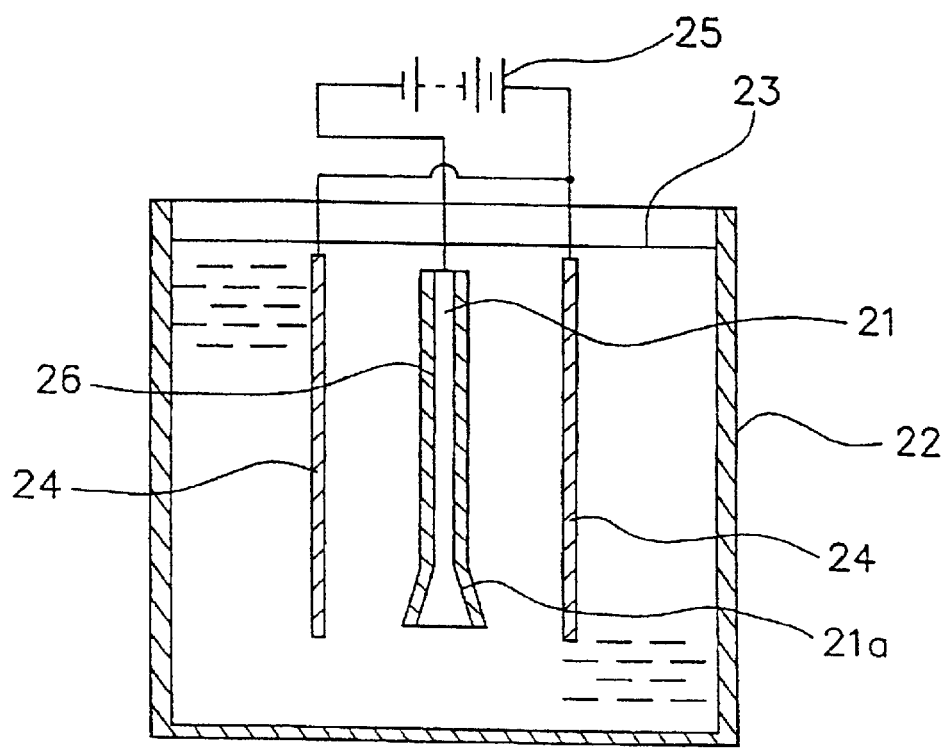
FIG. 3 is a schematic sectional view showing a device for manufacturing the metallic pipe of FIG. 2.

Next, a process for manufacturing the metallic pipe by electro-casting will be described with reference to FIGS. 2 and 3. A core workpiece 21 having a shape corresponding to that of the through-hole of the metallic pipe is firstly prepared. This core workpiece 21 has a tapered surface 21a at its one end which corresponds with the funnel-shaped portion 16b of the metallic pipe 16 shown in FIG. 2. As the core workpiece 21, a metal such as a stainless steel and a tungsten steel or a material having conductivity such as a resin including a metallic powder is used. When the surface of the core workpiece 21 is covered with a parting compound, it is easy to remove a layer of electro-casting, which will be described later.

The core workpiece 21 is immersed in a plating bath 22 containing a plating liquid for electro-casting 23 composed of a plating liquid of an alloy of iron-nickel or a plating liquid of an alloy of iron-nickel-cobalt. In the plating liquid for electro-casting 23, an electrode 24 is arranged to surround the core workpiece 21. It is preferable that the shape of the electrode 24 be annular. This arrangement permits forming a layer of electro-casting with even thickness and quality on the surface of the core workpiece 21. The core workpiece 21 and the electrode 24 are connected to power source 25 such that the core workpiece 21 is connected to the cathode of the power source 25 and the electrode 24 is connected to the anode of the power source.

When an electric current is passed through the core workpiece 21 and electrode 24 using the power source 25, a component of the plating liquid of the alloy of iron-nickel or the alloy of iron-nickel-cobalt adheres to the surface of the core workpiece 21 to form an electro-casting layer 26 comprising the alloy of iron-nickel or the alloy of iron-nickel-cobalt. When the core workpiece 21 is removed, the metallic pipe 16 having the small-diameter-pipe portion 16a shown in FIG. 2 can be obtained. The core workpiece 21 may be extracted or dissolved.

In order to form the electro-casting layer on the surface of the core workpiece 21, it is preferred that a chloride liquid, a sulfuric-acid liquid, a borofluoride liquid, etc., are used as the plating liquid. Among these, the chloride liquid is preferably used from the standpoint of plating speed and the quality of the electro-casting layer. More specifically, a liquid containing ferrous chloride as the principal ingredient is most preferred. In order to manufacture the electro-cast metallic pipe comprising the alloy of iron-nickel or the alloy of iron-nickel-cobalt, a plating liquid including components of nickel and cobalt other than ferrous chloride is preferably used. These kinds of plating liquids for electro-casting may contain impurities as long as characteristics are not deteriorated and incidental impurities.

Figure 4:
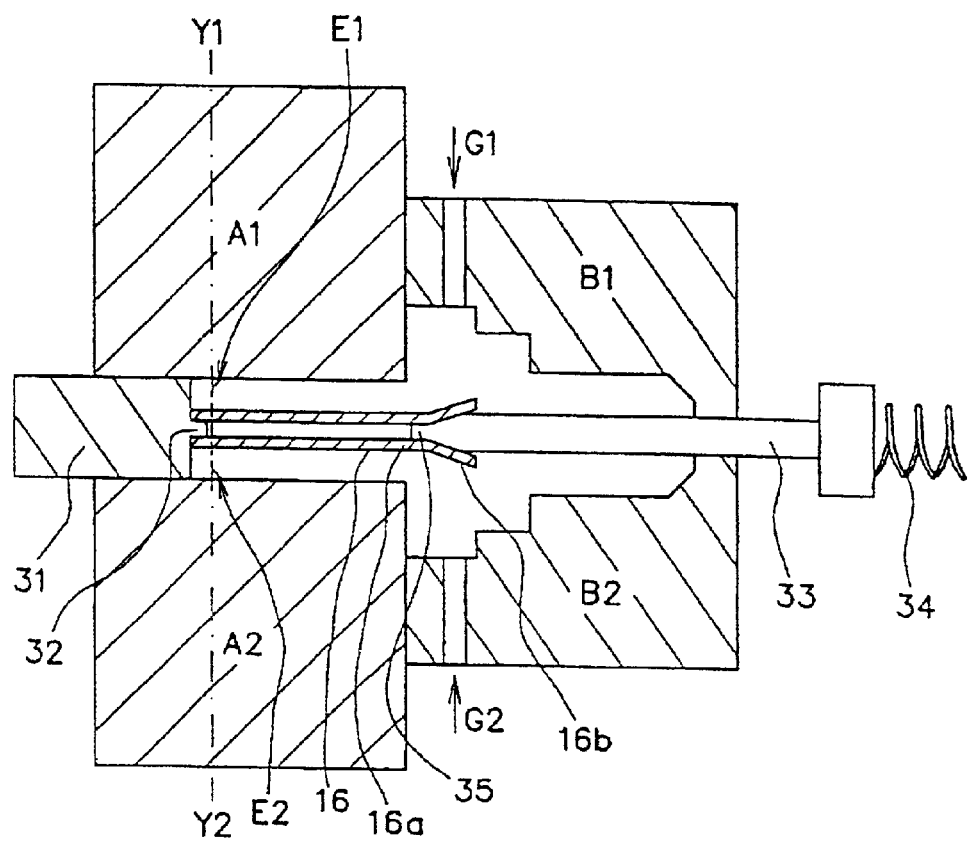
FIG. 4 is a schematic sectional view showing a process for manufacturing the ferrule of the present invention.

Referring to FIG. 4, a process for manufacturing the ferrule for the optical connector according to the present invention will now be described. A material formed of the invar material is preferably used to produce the metallic pipe 16 by way of deep drawing or electro-casting as explained above. The metallic pipe 16 having the funnel-shaped portion 16b with the other end expanding outwardly is preferably used. One end portion of the metallic pipe 16 is coupled to a fixed pin 32 of a fixed metallic mold 31 while the other end of the metallic pipe 16, i.e., the funnel-shaped portion 16b, is urged to the tip portion of a movable body 33 by urging means such as a spring member 34. The metallic pipe 16 may be fixed by inserting a protruding portion 35 (at the tip of the movable body 33) into the small-diameter-pipe portion 16a of the metallic pipe 16 from the funnel-shaped portion 16b. Thus, the fixing of the metallic pipe 16 is obtained which enables the position slippage to be reliably prevented.

Metallic molds A1 and A2 and metallic molds B1 and B2 are arranged around the metallic pipe 16 to form a space. Resin gate inlets G1 and G2 are provided in respective metallic molds B1 and B2 through which a thermotropic-liquid-crystal polymer is charged to fill the space. The thermotropic-liquid-crystal polymer is permitted to cure and the resin molding is taken out of the metallic molds. The left tip portion of the obtained resin molding (i.e. the butting side of optical fibers) is cut off at the position shown by the broken line Y1–Y2. Edge portions E1 and E2 are chamfered so as to complete manufacturing of the ferrule for an optical fiber. Although two of the edge portions E1 and E2 are only shown in the drawing, the edge portion is chamfered along the entire periphery.

By using this molding device, a ferrule for an optical connector having high connecting accuracy is obtained because the metallic pipe within the through-hole prevents the butting position of the optical fibers to slip. Since the metallic pipe has a small thermal coefficient of expansion, the ferrule enjoys small optical transmission loss as a function of environmental changes.

The method for manufacturing the ferrule for an optical connector of the present invention results in increasing the accuracy in connection of optical fibers, because one end of the metallic pipe is fixed to a pin of the metallic mold while the resin is charged into the space around the metallic pipe, thereby increasing the accuracy in the position of the metallic pipe relative to the ferrule body.

Figure 5:
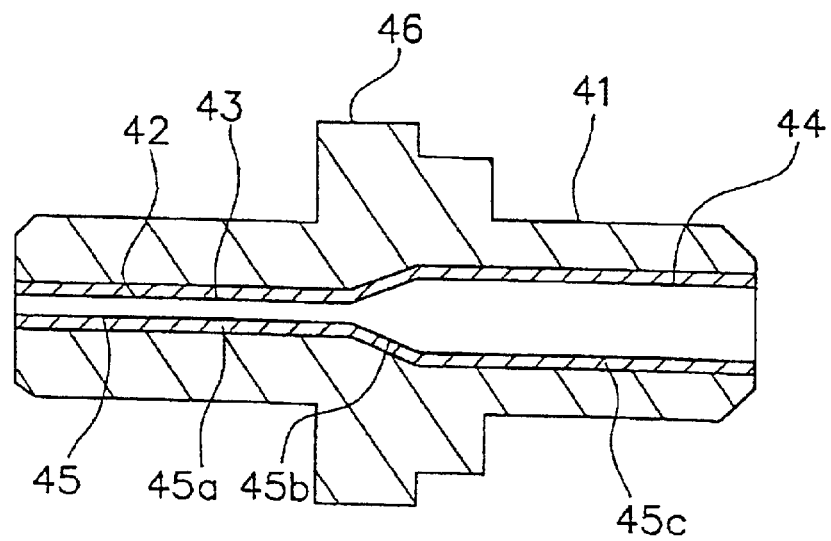
FIG. 5 is a sectional view of another example of a ferrule for an optical connector according to the present invention.
Figure 6:
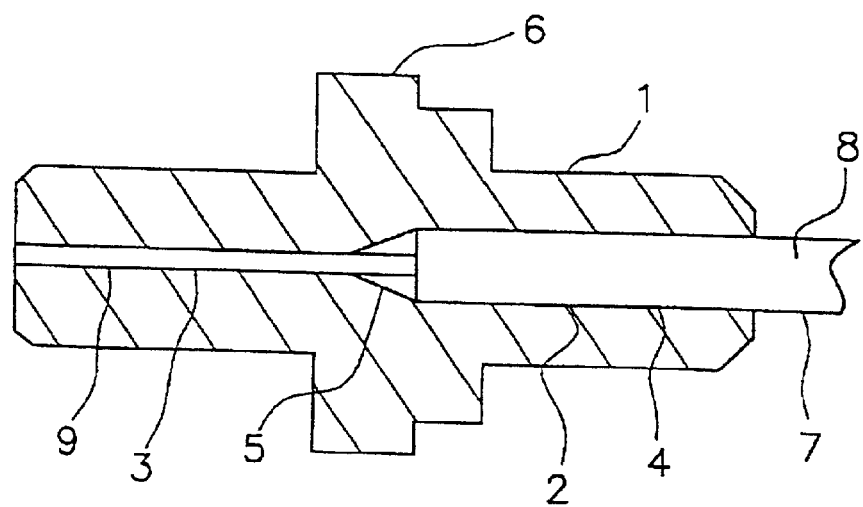
FIG. 6 is a sectional view showing a conventional ferrule for an optical connector.

FIG. 5 is a sectional view showing another example of a ferrule for an optical connector according to the present invention. In FIG. 5, the ferrule for an optical connector 41 has a through-hole 42 formed of a small-diameter portion 43 and a large-diameter portion 44. The small-diameter portion 43 and the large-diameter portion 44 are formed so that center axes thereof are axially aligned. A metallic pipe 45 is arranged along the entire length of the inner wall of the through-hole 42 and the metallic pipe 45 has a small-diameter-pipe portion 45a and a large-diameter-pipe portion 45c. A funnel-shaped portion 45b is disposed between the small-diameter-pipe portion 45a and the large-diameter-pipe portion 45c. Numeral 46 denotes a collar portion.

In addition, the cross-sectional shape of the through-hole in each of the examples described above is a circle; however, other shapes may be employed, such as an ellipse or a polygon such as a triangle or a square.

As explained above, the ferrule for an optical connector according to the present invention employs a metallic pipe made of an alloy of iron-nickel or an alloy of iron-nickel-cobalt, and a metallic pipe can be manufactured suitably by eletro-casting. Such an electro-casted metallic pipe is itself novel and may be used for other applications, because it is composed of an electroformed body, and the shape and dimension of the through-hole can be manufactured with high accuracy.

Further, because the metallic pipe is composed of an electroformed body of an iron-nickel alloy or iron-nickel-cobalt alloy and one end of the through-hole is funnel-shaped, the thermal expansion coefficient is low and the dimension of the through-hole is highly accurate. Advantageously, when the metallic pipe is used as the inner wall material of the through-hole of a ferule for optical connectors, the positional accuracy in placing optical fibers face to face is increased and the reliability of optical transmission is likewise improved.

Further, because the metallic pipe is composed of an electroformed body of an iron-nickel alloy or iron-nickel-cobalt alloy, the through-hole contains a small-diameter portion and a large-diameter portion, and the through-hole contains a funnel-shaped portion opening from the small-diameter portion toward the large-diameter portion, the thermal expansion coefficient of the metal article is low and the dimension of the through-hole is highly accurate, when the metal article is used as the inner wall material of the through-hole of a ferrule for optical connectors, the positional accuracy in placing optical fibers face to face is increased and the reliability of optical transmission is likewise improved.

Further, because the metallic pipe is composed of an electroformed body of invar or super invar, the thermal expansion coefficient is low and, as a result, the dimensions of the pipe advantageously do not substantially change as a function of temperature.

Furthermore, according to a manufacturing method of a metal article having a through-hole of the present invention, a core material is arranged in a plating bath, an electroformed body of an iron-nickel alloy or iron-nickel-cobalt ally is formed on the surface of the core material, and the core material is removed from the electroformed body. Consequently, the inner diameter of the through-hole is designed precisely, polishing the inner wall of the through-hole is not required, and the metal article enjoys precise dimensions by simply removing the core material.

While the invention has been particularly shown and described with reference to preferred embodiments thereof, it will be understood by those skilled in the art that the forgoing and other changes in form and details may be made therein without departing from the spirit of the invention.

What is claimed is:

1. A method for manufacturing a ferrule for an optical connector, comprising the steps of:
   fixing one end of a hollow metallic pipe to a pin of a metallic mold;
   arranging one or more metallic molds around the metallic pipe to form a space between the metallic molds and the metallic pipe;
   charging a resin for a ferrule body into the space; and
   curing the resin to produce the ferrule; wherein
      in the step of charging the resin, the resin is charged so as to surround substantially an entire outer surface of the metallic pipe, and no resin is charged into an interior of the metallic pipe such that the ferrule includes a hollow passage that extends entirely through the ferrule.

2. A method for manufacturing a ferrule for an optical connector, comprising the steps of:
   fixing one end of a hollow metallic pipe to a pin of a metallic mold;
   fixing another opposing end of the metallic pipe by way of a movable body which is urged against the metallic pipe;
   arranging metallic molds around the metallic pipe to form a space between the metallic molds and the metallic pipe;
   charging a resin for a ferrule body into the space; and
   curing the resin to produce the ferrule; wherein
      in the step of charging the resin, the resin is charged so as to surround substantially an entire outer surface of the metallic pipe, and no resin is charged into an interior of the metallic pipe such that the ferrule includes a hollow passage that extends entirely through the ferrule.

3. The method according to claim 2, wherein said step of fixing another opposing end of the metallic pipe is performed by urging the movable body against a tapered portion of the metallic pipe which expands outwardly.

4. The method according to claim 3, wherein the movable body has a larger diameter than an outer diameter of the metallic pipe.

* * * * *